Patented Jan. 23, 1945

2,367,702

UNITED STATES PATENT OFFICE 2,367,702

THIENYL AMINES AND METHOD OF MAKING THEM

Gerrit John Van Zoeren, Holland, Mich., assignor to The Wm. S. Merrell Company, Cincinnati, Ohio, a corporation of Delaware No Drawing. Application April 28, 1941, Serial No. 390,778

12 Claims. (Cl. 260—329)

This invention relates to a novel group of organic chemical compounds having valuable therapeutic properties and to medicinal compositions in which such compounds are used as medicinal agents.

More particularly my invention relates to heterocyclic substituted amino alkanes, especially thienyl amino alkanes and their derivatives, and to compositions of matter, including inhalants, topical medicaments and internal medicaments in which such compounds are used.

Prior to my invention it has been generally known and understood that many compounds of the general type

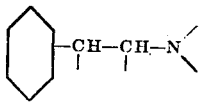

exert a vaso-constrictor action when applied topically in solution or substance or in vapor form or when taken internally.

I have now discovered that compounds having a heterocyclic nucleus instead of the benzene nucleus are very advantageous for these purposes and are in some respects superior to previously known compounds.

Accordingly, it is an object of my present invention to provide novel compositions of matter for physiological and therapeutic use.

The heterocyclic nuclei of the compounds used according to my invention, may be those of thiophene, pyrrole, pyridine, furan and related derivatives. Of these I have found the thienyl compounds to be of particular advantage.

Although I am giving below certain specific examples of my invention and its application in practical use and am giving also certain modifications and alternatives, it should be understood that these are not intended to be exhaustive or limiting of the invention. On the contrary, I am giving these as illustrations and am giving herewith explanations in order fully to acquaint others skilled in the art with my invention and the principles thereof and a suitable manner of its application in practical use, so that others skilled in the art may be enabled to modify the invention and to adapt it and apply it in numerous forms each as may be best suited to the requirement of a particular use.

EXAMPLE 1

Beta-thienyl-beta-methyl-alpha-methyl-alpha-amino ethane

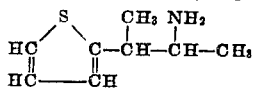

This compound may be prepared, for example, by a reaction carried out in two steps:

Step 1.—3-thienyl-butanone-2—

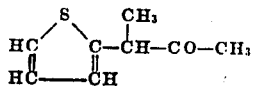

The Grignard reaction is carried out in a dry, four-necked flask. One neck carries an efficient condenser cooled with running ice-cold water and protected against ingress of moist air and carbon dioxide by a soda-lime tube. A second neck carries a thermometer reaching below the reaction level. A third neck carries a dropping funnel. A fourth and central opening of the flask carries a sealed agitator.

The flask is charged with 9.5 g. Grignard grade magnesium turnings, a crystal of iodine, about 30 cc. dry ether and 5 g. of 2-bromothiophene. After assembling it, the flask is immersed for a short time in warm water to start the reaction. When the initial reaction has subsided, and agitation commenced, about 50 cc. more dry ether is added and a solution of 55 g. of 2-bromothiophene in about 50 cc. dry ether is dropped in at such a rate that brisk boiling of the ether is maintained without external warming. After all the bromo-thiophene solution has been added, the flask is again immersed in hot water and refluxing continued for an extra half hour or until nearly all of the magnesium has reacted. The flask is now immersed in an ice and salt bath and cooled with good agitation. When the temperature of the Grignard solution has reached about —5° C., a solution of 37 g. of freshly fractionated 3-chlorobutanone ($CH_3.CHCl.CO.CH_3$)

is added drop-wise while maintaining the temperature below —5° C. Subsequently the reaction is allowed to proceed at about 0° C. for an additional one hour. The ice bath is then taken away and the reaction mixture is allowed to warm up gradually to room temperature and is then heated to boiling, when a rather violent reaction sets in and has to be regulated by occasional cooling. As soon as the reaction subsides, the flask is immersed in a hot water bath and the ether refluxed for a number of hours to finish the isomerization reaction. (The isomerization can be expedited, if desired, by distilling off the ether so as to raise the temperature).

The flask is cooled in ice water and the reaction product is treated with crushed ice, then with cold dilute acid (such as acetic or hydrochloric). By careful, slow stirring the solids gradually disappear. The layers are now allowed to stratify. The lower, aqueous layer is drawn off and shaken once with a little ether. The combined ether solution is shaken once with a small amount of cold dilute acid, then with water, then with a sodium carbonate solution to neutrality. It is finally washed twice with small amounts of cold water and subjected to fractionation. After the ether is driven off under atmospheric pressure, vacuum is applied and the 3-thienyl butanone is obtained in good yield as a colorless liquid boiling at 91-92° C. at about 8-9 mm.

Other halogenated thiophenes may be used to prepare the corresponding Grignard compounds.

*Step 2—Amination.*—Commercial ammonium carbonate, 57 g., is charged into a 250 cc. three-necked flask, which carries a wide diameter air tube connected to a cooled condenser, a thermometer and a dropping funnel. Concentrated formic acid (58 gm.) is slowly dropped in and then the temperature is raised slowly until the inside temperature reaches 170° C.

40.7 gm. of the thienyl butanone obtained under Step 1 is now dropped into the ammonium formate and the reaction mixture maintained at about 170° 3-4 hours. After cooling, the reaction mixture is treated with about 100 cc. water, shaken and the oil layer separated. The oil is refluxed with about 45 cc. concentrated hydrochloric acid about 1 hour, then diluted with about 100 cc. water and shaken with benzene to extract the non-basic impurities.

The aqueous acid solution, containing the desired amine, is made strongly alkaline by adding concentrated caustic soda while cooling. Benzene is added to facilitate the separation of the amine. The benzene solution of the amine is washed twice with small amounts of water, then fractionated. After distilling off most of the benzene under atmospheric pressure, vacuum is applied and the amine is isolated as a colorless oil boiling at 91-92° C. at about 11 mm.

The free amine and the carbonate of the above compound are effective vaso-constrictors with sufficient volatility to be administered as an inhalant, i. e., by drawing the breath intake over an exposed supply of the compounds, for constriction of nasal mucosa. These compounds generally show an extraordinarily low toxicity. The hydrochloride of this compound, for example, shows a minimum lethal dose, for intravenous injection in rabbits, of 55 mg. per kg. of body weight, as compared for example with control tests, under the same conditions with corresponding Benzedrine salts, showing minimum lethal dose of 20 to 25 mg. per kg. of body weight. At 65° F. the free amine gives a vapor pressure of 1 mm.

The novel compounds may be used as free amines or in the form of salts.

EXAMPLE 2

Beta-thienyl-alpha-methyl-alpha-amino ethane (3-thienyl-2-aminopropane)

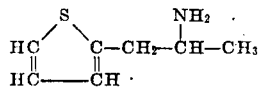

In the first step, 2-bromothiophene is reacted with magnesium in ether to form thienyl magnesium bromide. The cold solution is reacted with an ether solution of monochloracetone and the reaction mixture is subsequently heated as in Step 1 of Example 1, to form 3-thienyl-propanone-2. In the second step, 3-thienyl-propanone-2

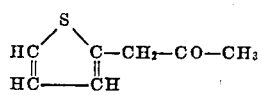

is heated at about 170° with ammonium formate following Step 2 of Example 1, to form the desired amine. The amine is isolated as a colorless liquid boiling at 95°-97° at 20 mm.

If in this second step of Example 2 methyl ammonium formate is used in place of ammonium formate one obtains 3-thienyl-2-methyl-aminopropane which is a colorless liquid.

By following the procedures indicated above one may obtain other ketones, such as 4-thienyl-butanone-3, from thienyl magnesium bromide and 1-halogenobutanone-2 ($CH_2ClCO\ CH_2CH_3$); 3-thienyl-pentanone-2 from 3-chloro-pentanone-2 and thienyl magnesium halides, etc. These ketones upon reaction with ammonium formate, methyl ammonium formate, and other alkyl ammonium formates give the corresponding amines or substituted amines.

It is to be noted that these same amines can be prepared by reacting the ketones with ammonia or alkylamines preferably in alcoholic solution in presence of a hydrogenating catalyst and hydrogen. Obviously, other well known methods can be used for the amination of the ketones such as the reduction of the ketones to the alcohols, halogenation of the alcohol group and subjection of the thienyl alkylhalide to amination by well-known processes.

The low molecular weight free amines and their carbonates have sufficient volatility to be used as inhalants.

I have also discovered that dicyclic amines are obtained by following the procedure of Example 1 modified as follows: Thienyl magnesium halide is made to react with 2-halogeno-cyclopentanone-1 to give thienyl-cyclopentanone,

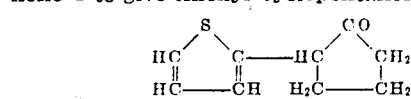

This upon amination gives the corresponding amine

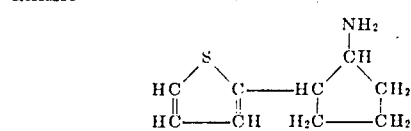

or the alkyl or aralkylamines, depending upon the amination reagent chosen.

The resulting amine compounds possess valuable sympathomimetic properties.

EXAMPLE 3

Beta-thienyl-beta-methyl-beta-hydroxy-alpha-aminoethane

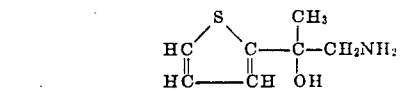

2-bromothiophene is reacted with magnesium in dry ether and the resulting Grignard reagent is treated in the cold (as in Step 1 of Example 1) with monochloracetone.

In contrast with Example 1, however, the ethereal reaction mixture is not allowed to warm and reflux; but is decomposed directly while keeping cold, with crushed ice and dilute acid, as is the case in normal Grignard reactions. The ethereal solution containing 2-thienyl-2-hydroxy-2-methyl-1-chloroethane

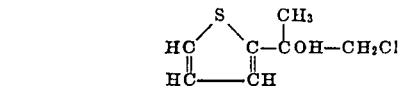

is used directly, or freed from the ether, for amination. The amination is accomplished by heating the chloroethane with a solution of ammonia, conveniently in methanol.

The amine is isolated in usual manner either as a salt, e. g., the hydrochloride or sulfate, or the free amine may also be separated by distillation under high vacuum as a thick, viscous oil. In an analogous manner other thienyl hydroxy alkylamines can be prepared by reacting in the cold thienyl magnesium halides with alpha halogeno ketones to form thienyl halogeno hydroxy alkanes, such as

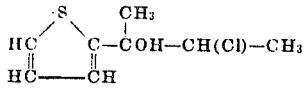

using 3-chloro-butanone-2 ($CH_3CHClCOCH_3$); or

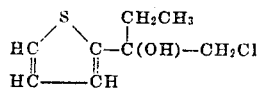

using 1-chloro-butanone-2. By using 2-chloro-cyclopentanone-1 one obtains

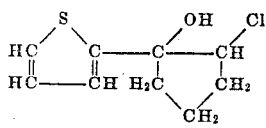

These chlorohydroxylated substances upon treatment with ammonia, alkylamines or aralkylamines are transformed to the corresponding thienylhydroxy-amino-alkanes, by substitution of the chlorine atom by ammonia or by the alkylamines.

The resulting amine compounds exhibit physiological activity which compare favorably with other sympathomimetic compounds known prior to my invention, and particularly in having lower toxicity as compared with the corresponding phenyl compounds.

Instead of the simple thienyl group, the thiophene nucleus may contain substituents.

In general, compounds found suitable for my invention are those of the class represented by the basic structural formula

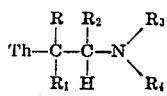

(it being understood that the arrangement of the R, R₁, R₂, R₃ and R₄ above or below the C or N in the formula is not significant.) The term Th represents the heterocylic nucleus and includes particularly thienyl. R is hydrogen or alkyl but, if R₁ is hydroxyl, R is preferably an alkyl group;

R₁ may be hydrogen, alkyl, or hydroxyl group;
R₂ is an alkyl group but R₂ may also be hydrogen if R₁ is an alkyl group;
R₃ is hydrogen or an alkyl group;
R₄ is hydrogen or an alkyl group.

In the preferred embodiments of my invention, each of the groups R, R₁, R₂, R₃ and R₄ will be not over three C-atoms, and advantageously the sum of the C-atoms in all these groups is less than eight. The term "alkyl" is used to include cycloalkyl groups such as cyclohexyl and aralkyl groups such as benzyl. As indicated under Example 2 above, R and R₂ may be joined to form a cyclic group including the C-atoms of the basic ethane structure give above.

The compounds referred to by the above general formula may also be designated as beta-thienyl-alpha-amino alkanes in which the alkane group contains more than 2 carbon atoms, the carbon atom to which the thienyl radical is joined being designated the beta carbon atom and the adjacent carbon atom in the chain being designated the alpha carbon atom. This is illustrated by the following formula:

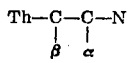

wherein the substituents on the carbon atoms and on the nitrogen atom are the same as explained above. Illustrative examples of the mono- and di-alkylated amino groups that may be present in the compounds herein disclosed are $-NHCH_3$, $-NHC_2H_5$, $N(CH_3)_2$, $-N(C_2H_5)_2$, etc.

Additional examples of the compounds within the scope of my invention are:

Beta-thienyl-beta-methyl-alpha-methyl-alphamethylamino ethane,
Beta-thienyl-beta-methyl-alpha-ethyl-alpha-amino ethane,
Beta-thienyl-alpha benzyl-alpha-amino ethane,
Beta-thienyl-beta-methyl-alpha-propyl-alpha-amino-ethane,
Beta-thienyl-beta-methyl-beta-hydroxy-alphamethylamino ethane,
Beta-thienyl-beta-hydroxy-beta-propyl-alpha-amino ethane,
Beta-thienyl-beta-methyl-beta-hydroxy-alpha-ethyl-alpha-amino ethane,
Beta-thienyl-beta-methyl-alpha-methylamino ethane,
Beta-thienyl-beta-methyl-alpha-amino ethane.

The optical isomers as well as the racemic mixtures of the above compounds are valuable for therapeutic and physiological purposes. The lower members of the non-hydroxylated series have been found to be active physiologically even by inhalation.

What I claim is:

1. A novel chemical compound, a beta-2-thienyl alpha-amine ethane in which there is at least one alkyl substituent upon an ethyl carbon, prepared for use as a therapeutic.

2. A novel chemical compound, a beta-2-thienyl alpha-amine ethane in which there is at least one substituent of the class consisting of alkyl and hydroxyl upon an ethyl carbon, and in which at least one other hydrogen outside the thienyl group is substituted by an alkyl group, prepared for use as a therapeutic.

3. A novel chemical compound, a beta-2-thienyl alpha-amine ethane in which there is at least one alkyl substituent upon an ethyl carbon and in which there is also a hydroxyl substituent upon an ethyl carbon, prepared for use as a therapeutic.

4. A novel chemical compound, beta-2-thienyl-alpha-amine alkane in which the alkane group contains more than two carbon atoms, prepared for use as a therapeutic.

5. A novel chemical compound, beta-2-thienyl-beta-alkyl-alpha-alkyl-alpha-amine ethane in which the alkyl groups respectively contain not more than three carbon atoms, prepared for use as a therapeutic.

6. A novel chemical compound, beta-2-thienyl-alpha-alkyl-alpha-alkylamine ethane in which the alkyl groups respectively contain not more than three carbon atoms, prepared for use as a therapeutic.

7. A novel chemical compound, a beta-2-thienyl-alpha-alkyl-alpha amine ethane, prepared for use as a therapeutic.

8. A novel chemical compound, a beta-2-thienyl-beta - alkyl - alpha - alkylalpha-alkylamine ethane, prepared for use as a therapeutic.

9. A novel chemical compound, beta-2-thienyl-alpha-methyl-alpha-amine ethane, prepared for use as a therapeutic.

10. A novel chemical compound, beta-2-thienyl-alpha-methyl-alpha-methylamine ethane, prepared for use as a therapeutic.

11. A novel chemical compound having the structural formula:

$$Th-CRR_1-CRH-NR_2R_2$$

wherein CR—CR is a substituted alkane of more than two carbon atoms and wherein one of the R's may be hydrogen; wherein $R_1$ is one of the class consisting of hydrogen, alkyl, and hydroxy; wherein $R_2$ is one of the class consisting of hydrogen and alkyl; wherein Th represents a thienyl radical in the 2 position, and wherein the total number of carbon atoms in the said chain attached to the thienyl is less than ten; prepared for use as a therapeutic.

12. A novel chemical compound having the structural formula:

$$Th-CRR_1-CR_2H-NR_3R_4$$

wherein the group $CR-CR_2H$ represents a substituted alkane of more than two carbon atoms; wherein $R_1$ is one of the class consisting of hydrogen, alkyl, and hydroxy; wherein $R_2$, $R_3$ and $R_4$ are each one of the class consisting of hydrogen and alkyl; wherein Th represents a thienyl radical in the 2 position, and wherein the total number of carbon atoms in the side chain attached to the thienyl is less than ten; prepared for use as a therapeutic.

G. JOHN VAN ZOEREN.